Figure 1:
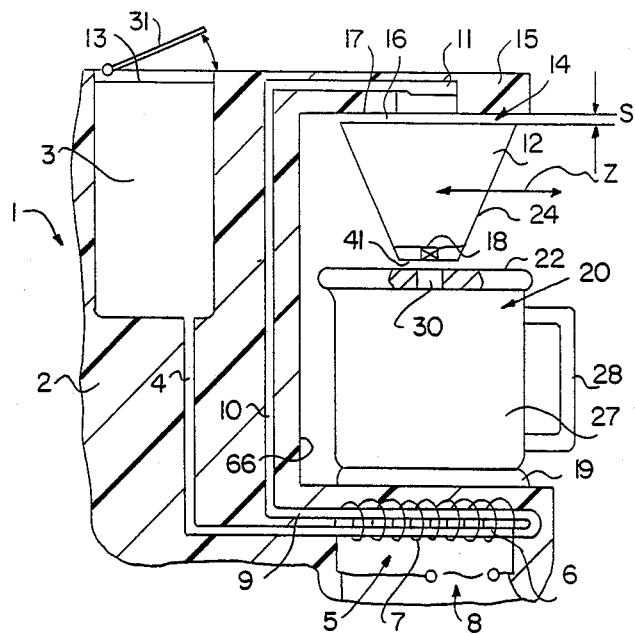

United States Patent [19]

Oppermann

[11] Patent Number: 4,911,067

[45] Date of Patent: Mar. 27, 1990

[54] INFUSION BEVERAGE MAKER

[75] Inventor: Günter Oppermann, Dietzenbach, Fed. Rep. of Germany

[73] Assignee: Braun Aktiengesellschaft, Kronberg, Fed. Rep. of Germany

[21] Appl. No.: 307,305

[22] Filed: Feb. 6, 1989

[30] Foreign Application Priority Data

Feb. 8, 1988 [DE] Fed. Rep. of Germany ....... 3803728

[51] Int. Cl.[4] ............................................. A47J 31/00
[52] U.S. Cl. ......................................... 99/299; 99/295
[58] Field of Search ................. 99/295, 279, 299, 306, 99/304, 305, 307; 426/433; 210/481, 474

[56] References Cited

U.S. PATENT DOCUMENTS

| 3,793,935 | 2/1974 | Martin . | |
| 4,667,587 | 5/1987 | Wunder | 99/295 |
| 4,779,520 | 10/1988 | Hauslein | 99/295 |

FOREIGN PATENT DOCUMENTS

| 79235 | 5/1983 | European Pat. Off. . |
| 227200 | 7/1987 | European Pat. Off. . |
| 2010675 | 9/1970 | Fed. Rep. of Germany . |
| 7235896 | 9/1972 | Fed. Rep. of Germany . |
| 2944264 | 5/1981 | Fed. Rep. of Germany . |
| 2188986 | 1/1974 | France . |

Primary Examiner—Robert W. Jenkins
Attorney, Agent, or Firm—Fish & Richardson

[57] ABSTRACT

The infusion beverage maker (1) is composed of a tank (3) supplying water which connects via a water pipe (4) to a continuous flow heater (5). A hot water line (10) emanating from the continuous flow heater (5) terminates into a supply port (11) arranged above the filter unit (12), the said filter unit (12) being detachably mounted on the housing (2) of the infusion beverage maker (1). Fixed to the bottom side (41) of the filter unit (12) is a valve assembly (43) forming a valve (18) and controlling the discharge of the infusion beverage into a storing receptacle (27). For every type of infusion beverage to be prepared, there is provision of one separate filter unit (36) each which, in case of need, can be substituted for the previously used filter unit (12).

13 Claims, 3 Drawing Sheets

INFUSION BEVERAGE MAKER

The present invention relates to an infusion beverage maker comprising an electric continuous flow heater which is supplied with water out of a tank, and comprising a hot water line emanating from the continuous flow heater and terminating into a supply port arranged above the filter unit, the said filter unit being detachably mounted on the housing of the infusion beverage maker, and with a valve assembly being fitted to the bottom side of the filter unit which controls the discharge of the infusion beverage into a storing receptacle.

A like infusion beverage maker is known from German published patent application No. 20 10 675. In practice, this infusion beverage maker is used either exclusively as coffee maker or exclusively as tea maker. When it is desired to use this infusion beverage maker both as coffee maker and as tea maker, it may occur for instance that infused tea has the faint taste of coffee in the event that coffee has been brewed beforehand with the same machine. An adulteration of taste will also be caused when tea has been made with this machine before coffee is made. The reason for this lies in that, despite thorough cleaning of the filter unit, the latter will nevertheless adopt the flavour of the extract previously put into the filter unit and will then emit it to the brewed beverage that is made with another extract in a subsequent infusion action.

Therefore, the instant invention has for its object to devise an infusion beverage maker which permits to make various infusion beverages without the result that the respective infusion beverage to be made includes remainders of flavour substances of previously made infusion beverages of a different kind. In addition thereto, it is another object of this invention to devise an infusion beverage maker intended for making coffee in such a fashion that it is also suitable for making tea without aromatic tea substances merging into the coffee, on the one hand, or aromatic coffee substances merging into the tea, on the other hand.

This object will be achieved by the present invention in that for every type of infusion beverage to be prepared, one separate filter unit each is provided which can be exchanged with the previously used filter unit if so desired. Now, for the first time ever, it is possible owing to this inventive arrangement to use a coffee maker as a tea maker as well, without the infused tea having the taste of coffee. This inventive arrangement offers the consumer the advantage of not having to buy several infusion beverage makers for different infusion beverages. That is to say, with one infusion beverage maker and by using several filter units, the consumer can make correspondingly many infusion beverages which are free from alien flavours.

Since the most common infusion beverages are coffee or tea, it is arranged for in an improvement of this invention that the interchangeable filter unit is meant for making tea. When making tea, as is known, the quality of the tea beverage is essentially depending upon how long the tea leaves remain in the hot water, that is, for how long the tea will draw. This is because up to roughly three minutes of infusion time, the tea will emit substances to the water which will stimulate the circulation of a tea drinker after the consumption of this infusion beverage. Yet when the tea stands for longer than three minutes, active substances are set free in the tea leaves which will reduce the circulation of a consumer upon consumption of this infusion beverage, that means they rather contribute to calming him down. When it is now desired to keep to a specific tea infusion time, what is imperative for the tea's quality, while at the same time making more cups of tea than the filter unit is able to receive, without the infusion beverage dripping over the filter unit and contaminating the infusion beverage maker and/or the jug stand, it is furthermore arranged that the valve assembly remains closed during the tea's infusion time, that an orifice terminating into a spill port is designed on the filter unit and that the outlet of the valve assembly terminates into the end portion of the spill port. Due to the great rate of delivery of continuous flow heaters, the filter unit will be filled already in the event of a very short infusion time, when it is desired to make more cups of beverages than the filter unit is able to receive. Water continuing to flow into the filter unit may discharge through the orifice into the spill port in a controller manner. The infusion beverage entering the spill port will already then flow via the end portion out of the filter unit into the storing receptacle placed beneath the filter unit.

Owning to the fact that the outlet of the valve assembly terminates into the end portion of the spill port, it will be achieved after the valve assembly is opened that only one supply port is designed on the filter unit, from which the infusion beverage is discharged directly into the storing receptacle.

To prevent that the outlet of the valve assembly gets stuffed up by tea leaves, it is provided in an improvement of this invention that a case that is open towards the supply port can be inserted into the filter unit, with at least part of the case's wall being apertured like a sieve. Another advantage of this case is that, when only a small quantity of tea is infused, the case containing the tea leaves can be removed from the filter unit after the infusion action without needing to remove the infusion beverage from the filter unit. Namely in this event, it will be possible to leave the infusion beverage in the filter unit and to pour out one cup only, for example, by opening the valve assembly, while the rest can remain in the filter unit and can be taken out at a later point of time. That is to say, owing to this arrangement, there is no need to use the carafe for infusion beverages which can receive e.g. twelve cups and thus is considerably larger in volume when a small quantity of tea is desired. The direct filling of a tea cup prevents that the infusion beverage cools off too much when the infusion beverage is put into intermediate storage in a jug for infusion beverages.

Further, it is expedient that a cup can be inserted into the filter unit for making small quantities of tea. Consequently, the inventive filter unit can also be used as a retaining device for a cup containing a tea bag, for instance, which cup will then only have to be filled with hot water that is produced by the continuous flow heater.

To allow removing the sieve-like designed case and/or the cup from the filter unit without scalding one's hand and in order to simultaneously ensure that the filling hole of the filter unit is furthermore sufficiently tightly closed by a lid which is designed on the housing of the infusion beverage maker and contains the supply port of the hot water line, with a view to avoiding aroma and temperature losses, the side wall of the filter unit is furnished with an upwardly open recess forming an orifice through which a handle is extending that projects radially from the case and/or the cup. Herein, the thickness of the handle is chosen such that the contour on the upper side of the filter unit is maintained. It has proved to be of special advantage when the recess simultaneously serves as orifice for the spill port and when the said spill port extends alongside of the peripheral surface of the filter unit. Owing to this combination, additional cuts on the filter unit are avoided.

To safeguard that tea leaves possibly floating on the surface of the infusion beverage will not enter the spill port during the overflow process, it is arranged for in an improvement of this invention that the recess is furnished with one or more slots extending substantially longitudinally to the spill port.

To limit the infusion time of the infusion beverage, the outlet of the valve assembly can be opened by hand or by means of a timer. This timer can be mounted on the infusion beverage maker, for example.

It is an advantage that, due to its manufacture by injection-moulding or casting process, the filter unit contains an orifice in the end portion of the spill port, and that the adjusting device required for actuating the valve assembly comprises means for sealing this orifice. Owing to this inventive arrangement, the adjusting device which is necessary anyway seals off the orifice at the same time. This results in curtailing the manufacturing costs for the filter unit. It is furthermore favourable that the valve assembly is composed of a valve member which closes the outlet and which is fixed to a spring taking support on the filter unit, and that this spring for actuating the valve assembly is operable by an eccentric which, via a radially outwardly extending rod, is coupled with an operating knob mounted on the peripheral surface of the filter unit. This arrangement affords to economize additional component parts and renders the assembly particularly simple.

Figure 2:
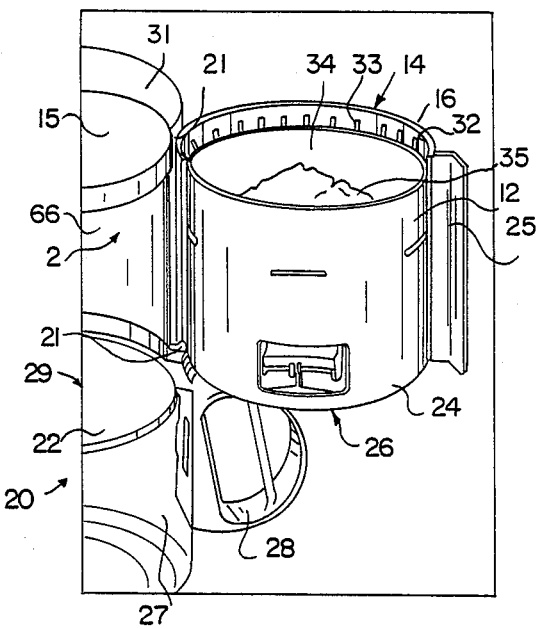
Figure 3:
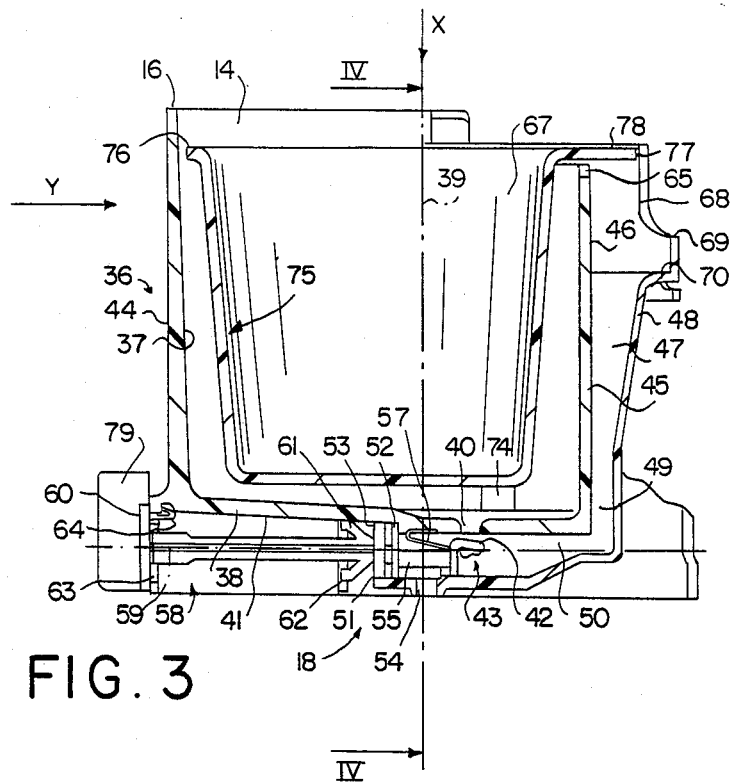
Figure 4:
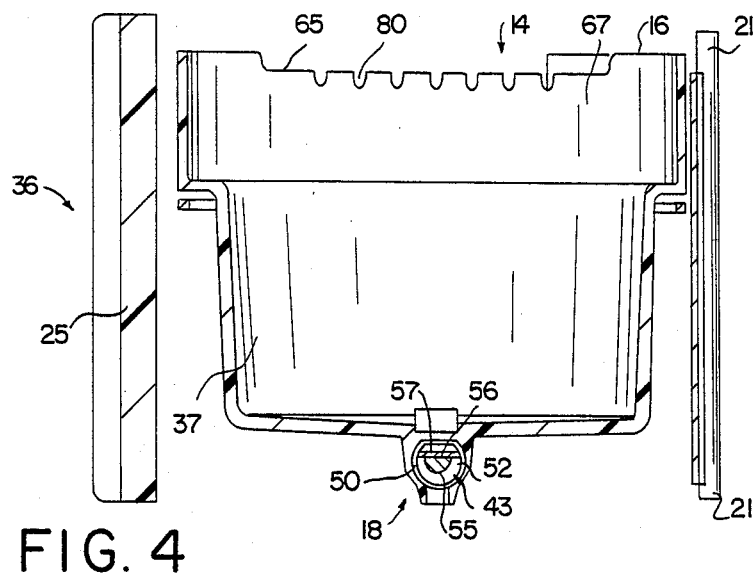
Figure 5:
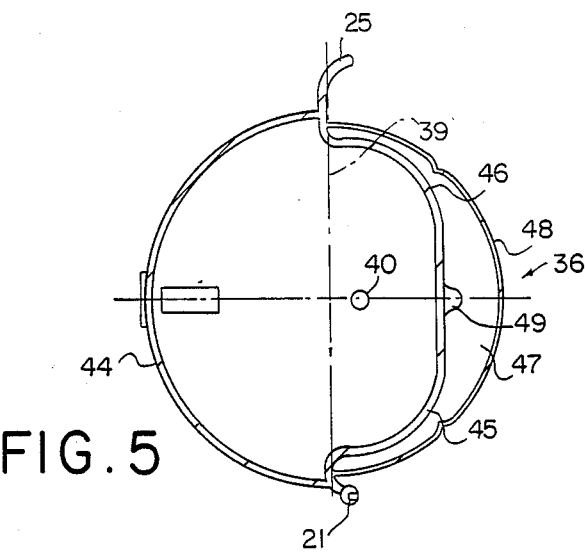
Figure 6:
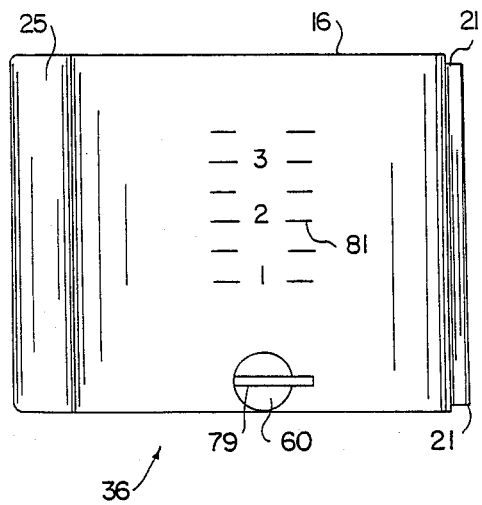
Figure 7:
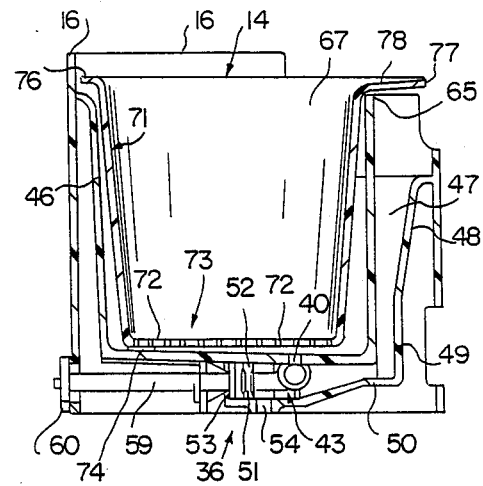

One embodiment of this invention is illustrated in the accompanying drawings and will be described in more detail hereinbelow. In the drawings, FIG. 1 is a schematically illustrated infusion beverage maker without showing the housing which interconnects the individual component parts, FIG. 2 is a partial view of a perspectively illustrated infusion beverage maker, wherein the filter unit is pivoted out of the housing, FIG. 3 is a longitudinal cross-section taken through a filter unit according to this invention, a cup being inserted into the filter unit, FIG. 4 is a longitudinal cross-section taken along the line of intersection IV - IV in FIG. 3, yet the cup that is inserted into the filter unit in FIG. 3 being not shown, FIG. 5 is a top view on the filter unit in the direction X according to FIG. 3, FIG. 6 is a side view on the filter unit in the direction Y according to FIG. 3, and FIG. 7 is the like illustration of the filter unit according to FIG. 3, yet with a case that is sieve-like apertured on its bottom being inserted into the filter unit.

To avoid repetitions, like component parts and/or walls have been assigned like reference numerals in FIGS. 1 to 7.

FIG. 1 illustrates schematically a beverage maker 1, more particularly a coffee maker. This coffee maker 1 comprises a tank 3 integrated in a housing 2 which serves as a water reservoir and which is connected to a water pipe 4 on its bottom end in the drawing. This water pipe establishes the connection to a continuous flow heater 5 which is designed as a heat pump and is located beneath the tank 3 in the housing 2. The continuous flow heater 5 usually is composed of a water pipe 6 that is connected to the water pipe 4 and, during operation, is energized by a heater element furnished with a filament 7. This filament 7 is connectible with an electric energy source 8 for heating up. The outlet line 9 communicates with a hot water line 10 which, by way of its supply port 11, ends above a filter unit 12 designed as coffee filter. Said supply port 11 is designed roughly at the level of the inlet orifice 13 to the end that, when the tank 3 is full, water may not already flow through the supply port 11 into the filter 12 when the coffee maker 1 has not yet been switched on.

In the swung-in condition of the filter unit 12, that means the filter unit 12 is in its ready position, its fill opening 14 which, in FIG. 1, is open upwardly towards the supply port 11 and is arranged therebeneath is covered by a lid-shaped projection 15 arranged on the housing 2 in such a fashion that only a very small gap is left between the upper edge 16 of the coffee filter 12 and the bottom edge 17 of the circular projection 15 which essentially is conformed to the outer contour of the coffee filter 12. On its bottom end in the drawing, the coffee filter 12 comprises a valve 18 which will open automatically only when the coffee filter 12 has been properly pivoted into the housing 2 and, simultaneously, the jug 20 which has been placed beneath the coffee filter 12 on a hot plate 19 and which serves as a storing receptacle for the infusion beverage has reached its due position. To heat the hot plate 19, simultaneously, the continuous flow heater 5 is serving which is arranged beneath the hot plate 19 and which is controllable by thermic control elements not shown in FIG. 1.

FIG. 2 depicts once more, partly in a perspective view, the coffee maker shown in FIG. 1 and sold already a million times, as can be gathered from the selling program survey, edition autumn 1987, top of page 31, of the company Braun Aktiengesellschaft in Kronberg/Ts. In this illustration, the position of the coffee filter 12 pivoted out of the housing 2 has been shown for better understanding. For pivoting out, this coffee filter 12 comprises at its left-hand end in FIG. 2 a hinge joint 21 formed with the housing 2 which imparts to the coffee filter 12 a substantially parallel movement relative to the upper side 22 of the jug 20, as is also indicated by the directions of the arrow Z.

For better handling the coffee filter 12, a handle 25 is shaped at its outward peripheral surface 24. A rod assembly 26 serving to control the valve 18 hinted at in FIG. 1 is arranged on the bottom of the coffee filter 12 in FIG. 2. Beneath the coffee filter 12, in FIG. 2 the housing 2 incorporates the storing receptacle 20 which is composed of a glass carafe 27 with a handle 28 cemented to its peripheral surface and with a lid 29 closing the fill opening. In its middle, the cylindrical lid 29 is furnished with a bore 30 which, in the ready position of the beverage maker 1 as shown in FIG. 1, is placed vertically below the valve 18 in order to allow unhindered flow of the infusion beverage from the filter unit 12 to the storing receptacle 20.

In FIGS. 1 and 2, there is still discernible a tank lid 31 which closes the tank 3 and can be opened to the upper side. As can be seen further from FIG. 2, longitudinally extending ribs 33 are shaped on the coffee filter 12 on said's inner surface 32 which extends V-shaped downwardly in the drawing, the said ribs allowing better flow of the coffee through the coffee filter 34 to the inner surface 32. The coffee filter 12 shown in FIG. 2 is filled with coffee powder 35 for the subsequent brewing action.

Instead of the coffee filter 12 illustrated in FIG. 2, the instant invention also affords to insert a tea filter 36 which has the same companion dimensions like the coffee filter 12 so that it can be inserted just as easily into the already existing coffee maker 1 and is completely integrated in it.

The tea filter 36 illustrated in FIGS. 3 to 7 is substantially composed of a cylindrical case 37 which is open to the upper side through the inlet orifice 14 which extends substantially cylindrically and which is confined downwards by a horizontally extending bottom 38. This bottom 38 is penetrated by an outlet 40 which forms the valve assembly 43 in conjunction with a valve member 42 fixed to the bottom side 41 of the bottom 38. The outlet 40 is arranged on the right hand of the centre line 39 of the case 37 on the bottom 38 in Figures 3 and 5. The inner surface of the bottom 38 extends coniconically to the outlet 40 in order to allow the quantity of infusion beverage that is disposed in the case 37 to completely flow off when the valve assembly 43 is open. As becomes apparent from FIG. 5, the portion 44 of the reservoir 37, when viewed from the centre line 39, is of cylindrical configuration, while the portion 45 of the case 37 placed on the right hand of the centre line 39 is designed substantially like a lying U which is open to the left side.

In FIGS. 3, 5 and 7, a spill port 47 extending from the top to the bottom is shaped on the radially outward peripheral surface 46, which port, in the plan view according to FIG. 5, is of half-moon-shaped design and its radially outward wall 48 forming a circular cross-section with the left portion 44. According to FIG. 3, this spill port 47 is tapering from the top to the bottom like a funnel and passes over into the duct portion 49, succeeding which beneath the bottom 38 is a second duct portion 50 which extends in parallel to the bottom 38 and into which the outlet 40 is terminating. This second duct portion 50 is at its opening 53 sealedly closed by a piston 52 provided with radial seals 51. On the left hand of the piston 52, the bottom duct wall of the second duct portion 50 is succeeded by a supply port 54 which forms the actual outlet opening in relation to the bore 30 of the storing receptacle 20 designed in the lid 29.

The supply port 54 is disposed on the centre line 39, while the outlet 40 is designed on the bottom 38 on the right hand of the centre line 39. In FIG. 3, neighbouring the piston 52 on its right hand is a peg 55 which is semicircular in cross-section and on the upper side 56 of which a spring element 57 is resiliently abutting that is preferably made of metal and is designed like a sheet-metal strip. At the height of the centre line of the outlet opening 40, a bore 58 is placed on this spring element 57 into which the valve member 42 lying opposite to the outlet 40 is buttoned, the said valve member being made of rubber-elastic material for better sealing the outlet 40. Peg 55 represents the eccentric actuation in relation to the spring element 57 coupled to the valve member 42. Peg 55 is placed such in the second duct portion 50 designed as a chamber that there is still a sufficient passage from the outlet 40 to the supply port 54.

On the free end to the left of the second duct portion 50, the piston 52 is succeeded by the adjusting device 58 which consists of a rod 59 and an operating knob 60 adjacent to the rod 59 at its radially outward end, as can be seen clearly from FIG. 3. The adjusting device 58 together with the piston 52 and the peg 55 are hung into a bore 62 aligning with the second duct portion 50 via retaining arms 61 designed on the rod 59. A bore 63 which is designed on the radially outward end on the housing 2 and which likewise is in alignment with the bore 62 serves to axially retain the component parts which are rigidly coupled with the rod 59 such as operating knob 60, piston 52 and peg 55 by means of lock elements 64 which are not described in more detail. Only after the assembly of the rod 59 will the actuating element 60 be seated from the outside on said rod in frictional engagement therewith. In FIGS. 3, 5 and 7, a recess and/or opening 65 is provided on the right-hand side on the upper edge 16 of the peripheral surface 46 of the case 37, which recess, as is shown in FIG. 4, is furnished with slots 80 extending in parallel to the centre line 39 and being equally spaced over the circumference. This recess 65 is arranged on that side of the tea filter 36 which will abut on the inner wall 66 (see FIGS. 1 and 2) when the tea filter 36 is pivoted into the infusion beverage maker 1 and/or is at a small distance opposite to said wall so that, in the ready position, this recess 65 will not be discernible from the outside because the edge lying opposite to the recess 65 will hide the latter.

The filling chamber 67 of the case 37 connects to the spill port 47 via this recess 65. On the wall 48 of the spill port 47, a cut-out portion 68 is provided in the area of the recess 65, the bottom end of which is represented by the edge 69 according to FIGS. 3 and 4. Slightly beneath the edge 69, the wall 48 comprises a waist 70, at which the downwardly conical tapering of the spill port 47 is commencing.

In FIG. 7, another case 71 is inserted into the filling chamber 67 of the case 37, the said case 71 containing several through-holes 72 on its bottom 73 which design the bottom 73 like a sieve. Beneath the bottom 73, small stems 74 are shaped thereon (see in this respect FIG. 3) which constitute a distance between the case 71 and the bottom 38 of the case 37 of the tea filter 36. As a result, the infusion beverage flowing out of the case 71, which represents a tea strainer in a known fashion, may reach the outlet 40 unhindered.

In FIG. 3, a receptacle 75 is likewise inserted into the case 37 which, however, is not furnished with through-holes 72, as is shown by the case 71 in FIG. 7. This receptacle 75 is a conventional cup as it is insertable into the case 37 of the tea filter 36 for instance for pouring water on a tea bag or on instant coffee. In FIGS. 3 and 7, both receptacles 71, 75 comprise on their upper edge 76 in the area of the cut-out portion 65 a radially outwardly extending handle 77 in the form of a lug, whose upper side 78 extends at a sufficiently large distance beneath the upper edge 16 of the case 37. The handle 77 is easily accessible from above and/or sideways via the cut-out portion 68.

The tea strainer 71 extends from the bottom 73 in FIG. 7 to expand conically upwardly so that its manufacture of plastics is simple, on the one hand, and the removal of the tea leaves is easily done. The cup 75 has the same shape, yet its radial dimensions are slightly smaller than the tea strainer 71 so that, in case of need, e.g. for space economy reasons, it can be inserted into the tea strainer 71 as well.

The mode of function and/or the use of the inventive tea filter in the associated coffee maker is as follows:

When, for instance, coffee has been made before in the coffee maker, as is illustrated in FIG. 2 and manufactured for years already in large quantities, and when it is now desired to make tea or instant coffee, the coffee filter 12 will be taken out via the hinge joint 21 from the housing 2 by slightly lifting it and shifting it sideways, and the tea filter 36, as shown in FIGS. 3 to 7, will be hung into the housing 2 via the hinge joint 21 in the reverse manner. Beforehand, the tea strainer 71 has been inserted into the case 37 of the tea filter 36 and filled with tea leaves, if tea is to be made.

Now the tea filter 36 is pivoted into the housing 2 up to its ready position (FIG. 1), while attention must be paid that the rib 79 of the operating knob is in the position CLOSED (see FIG. 6), in order to ensure that the valve 18 shuts off the outlet 40. After the tank 3 is filled with water, the coffee maker 1 operating as tea maker can be put into operation by pressing the switch (not shown) connected with the continuous flow heater 5.

The water which is transported out of the continuous flow heater 5 via the hot water line 10 upwards flows through the supply port 11 into the tea strainer 71. In case more water has been filled into the tank 3 than the case 37 is able to receive, the excess infusion beverage will discharge via the recess 65 into the spill port 47 and from there via the second duct portion 50 to the supply port 54, from where it exits from the tea filter 36 and flows into the jug 27 placed underneath.

As soon as the predetermined infusion time is terminated, the operating knob 60 will be turned by hand in counterclockwise direction until the rib 79 shows to the position OPENED. The valved 18 is now open, and the infusion beverage made flows out of the case 37 through the outlet 40 and sideways past the valve 18 to the supply port 54. This inventive tea filter 36 with its valve 18 renders it possible to limit the infusion time to a period of time desired by the consumer, thereby preventing that the undesirable tannin is extracted from the tea, as is the case with tea.

When a consumer wishes to pour water on a tea bag or on instant coffee, for instance, then it is merely required to insert into the case 37 the cup 75 illustrated in FIG. 3 and containing a tea bag or instant coffee and to let hot water flow in there through the supply port 11, with valve 18 closed. After the tea has been allowed to draw, the tea filter 36 can be swung out of the housing 2 of the coffee maker 1, and the receptacle 75 can be taken out. Preferably, the tea filter 36 is made of transparent plastics. There are marks 81 on its front side for indicating the fluid level, as is depicted in FIG. 6.

I claim:

1. An infusion beverage maker comprising a housing that includes a surface for receiving a storing receptacle, a filter unit detachably mounted on said housing above said surface, an electric continuous flow heater which is adapted to be supplied with water out of a tank, a hot water line emanating from said continuous flow heater and terminating into a supply port arranged above said filter unit, said filter unit having an outlet and a valve assembly fitted to the bottom side of said filter unit for controlling the discharge of the infusion beverage through said outlet into a storing receptacle on said surface, structure defining a spill channel extending from an inlet opening at the upper side of said filter unit to a spill port at the bottom side of said filter unit, said spill channel structure guiding the infusion beverage, when overflowing out of said filter unit, to said spill port, said outlet and said valve assembly being adjacent said spill port of said spill channel, said spill port guiding said infusion beverage into a storing receptacle on said surface, and a case for insertion into said filter unit, said case being open towards said supply port and, at least part of the wall of said case being of sieve-like design.

2. Apparatus as claimed in claim 1 wherein only the bottom of said case is sieve-like apertured.

3. Apparatus as claimed in claim 1 wherein said case has a radially projecting handle, and the side wall of said filter unit is furnished with an upwardly open recess which forms said spill channel inlet opening, at least in part, said handle extending through said recess when said case is in said filter unit, the thickness of said handle being such that the contour on the upper side of said filter unit is maintained.

4. Apparatus as claimed in claim 3 wherein said recess simultaneously serves as said inlet opening for said spill channel, and said spill channel extends alongside of the peripheral surface of said filter unit.

5. Apparatus as claimed in claim 4 wherein said recess comprises one or more slots extending substantially longitudinally to said spill channel.

6. Apparatus as claimed in claim 1 wherein said filter unit contains an orifice in the end portion of said spill channel, and said adjusting device for actuating said valve assembly includes means for sealing said orifice.

7. Apparatus as claimed in claim 6 wherein said valve assembly includes an eccentric, a valve member which closes said outlet, and a spring element carrying said valve member and being supported on said filter unit, said spring element being operable by said eccentric via a radially outwardly extending rod that is coupled to an operating knob mounted on the peripheral surface of the filter unit for actuating said valve assembly.

8. A filter unit for making an infusion beverage for detachable mounting on the housing of an infusion beverage marker, said filter unit having an outlet at the bottom of said filter unit, a spill channel with an inlet opening on the upper side of said filter unit and a spill port on the bottom side of said filter unit, a valve assembly, an adjusting device for controlling said valve assembly in dependence on its position to control the discharge of the infusion beverage through said outlet into a storing receptacle, said outlet and said adjusting device of said valve assembly terminating at the end portion of the spill channel, and structure defining an orifice that extends substantially transversely to said outlet, said orifice being penetrated by said adjusting device and sealed relative to the outside by a sealing element on said adjusting device.

9. A filter unit as claimed in claim 8, wherein said valve assembly includes a valve member for closing said outlet, and said adjusting device includes an eccentric and a spring element supported on said filter unit, said spring element carrying said valve member and being operable by said eccentric for actuating said valve assembly.

10. A filter unit as claimed in claim 9, wherein said eccentric is coupled via a radially outwardly extending rod to an operating knob mounted on the peripheral surface of said filter unit.

11. A filter unit for making tea for detachable mounting on the housing of an infusion beverage maker below a supply port, said filter unit including structure defining a chamber with an outlet at the bottom of said chamber, a spill channel with an inlet opening on the upper side of said filter unit and a spill port on the bottom side of said filter unit, a valve assembly, an adjusting device for controlling said valve assembly in dependence on its position to control the discharge of the infusion beverage from said chamber through said outlet into a storing receptacle, and a case insertable into said chamber of said filter unit, said case being open towards said supply port when said case is inserted into said filter unit, at least part of the wall of said case being of sieve-like design, said case having a radially outwardly projecting handle, and the upper side of the side wall of said filter unit being furnished with an upwardly open recess which forms said inlet opening for said spill channel, said recess being penetrated by said handle when said case is placed in position in said filter unit.

12. A filter unit as claimed in claim 11 wherein the thickness of said handle is such as to preserve the contour on the upper side of said filter unit.

13. A filter unit a claimed in claim 11, wherein said recess comprises a slot extending substantially longitudinally to said spill channel.

* * * * *